(12) United States Patent
Singaliese

(10) Patent No.: US 6,535,581 B2
(45) Date of Patent: Mar. 18, 2003

(54) BYPASS FOR TELEPHONE SYSTEM SPLITTER

(75) Inventor: Michael Singaliese, New Canaan, CT (US)

(73) Assignee: Mphase Technologies, Norwalk, CT (US)

( * ) Notice: Subject to any disclaimer, the term of this patent is extended or adjusted under 35 U.S.C. 154(b) by 0 days.

(21) Appl. No.: 09/871,085

(22) Filed: May 31, 2001

(65) Prior Publication Data
US 2002/0181666 A1 Dec. 5, 2002

(51) Int. Cl.[7] .......................... H04M 1/24; H04M 3/08; H04M 3/22
(52) U.S. Cl. ................ 379/29.01; 379/9.06; 379/22.07; 379/29.01; 370/248; 370/251
(58) Field of Search .............................. 379/1.01, 1.03, 379/9, 9.06, 12, 16, 22, 26.01, 27.02, 27.03, 28, 29.01, 29.02, 32.02, 22.07; 370/241, 242, 248, 247, 251

(56) References Cited

U.S. PATENT DOCUMENTS 6,181,775 B1 * 1/2001 Bella ........................... 379/29
6,278,769 B1 * 8/2001 Bella ........................ 379/29.11
6,301,227 B1 * 10/2001 Antoniu et al. ............. 370/241
6,480,575 B2 * 11/2002 Chea, Jr. et al. ................ 379/9

FOREIGN PATENT DOCUMENTS

WO    WO 01/65816 A3 *  9/2001    ............ H04M/3/30

* cited by examiner

Primary Examiner—Binh Tieu
(74) Attorney, Agent, or Firm—Perman & Green, LLP

(57) ABSTRACT

In a telephone communication system employing a lower spectral band and a higher spectral band for communication of voice and video, wherein the system includes a first line for carrying signals at both the first and the second spectral bands and a second line for carrying signals at only the second spectral band, and wherein capacitors are employed for connection of the second line to the first line for exclusion of DC at a signal splitter of the communication system, the system has a bypass DC signal path for an alternative connection of the second line to the first line in substitution for the connection of the capacitors. The bypass can be activated electronically and remotely to establish conditions for the conduction of test of the signal carrying lines.

9 Claims, 4 Drawing Sheets

BYPASS FOR TELEPHONE SYSTEM SPLITTER

BACKGROUND OF THE INVENTION

This invention relates to telephone communication equipment and, more particularly, to a compact configuration of circuitry employed in separation of video/data signals and voice signals in the central office of a telephone company (telco) and, more particularly, to an electronically activated bypass of a POTS splitter to enable testing of a DSL line.

Telephonic communication among homes, businesses, and other facilities is accomplished in well-known fashion via one or more central offices of a telephone company with the electrical signals being communicated via pairs (twisted pairs) of electrically conducting wires. Voice signals are transmitted in a frequency band of a few kilohertz (kHz), typically 0–4 kHz, wherein the twisted wire pair can carry signals ranging from DC (direct current) to the high frequency cutoff of the transmission circuitry. For normal voice signal transmission, the high frequency cutoff is in the range of approximately 3–4 kHz. However, the twisted wire pair is capable of transmission of electrical signals of higher frequency, suitable for computer modem digital communication, and for compressed video signals such as video signals transmitted in the MPEG-2 format, wherein a DSL frequency band of 30 kHz to 1104 kHz (kilohertz) is available for these signals. Unlike transmission of such signals by coaxial cable and by satellites wherein the signals are modulated onto carriers, in the transmission of the signals via the twisted wire pair there is no use of a carrier and the signals are transmitted in their baseband format. As a result, there is considerable interest in the use of telephone lines of the telco for communication of high-speed modem signals and compressed video signals in addition to voice signals among the homes, businesses, and other facilities who are the telephone subscribers.

In communication, via the telephone lines, of the combined signals of voice plus video, or other higher frequency signals such as the high speed data transmitted by modem signals, the fidelity of the voice signal is enhanced by separating the voice signal from the high frequency signals. Voice circuitry, such as transmitter and receiver, is employed for handling the voice communication, and DSL (digital subscriber line) circuitry is employed for handling the video and the data. At the telco and at the subscriber premises, the voice and the video are handled separately by the voice and DSL circuits, while between telco and the subscriber premises, both voice and video are communicated by a common twisted pair.

In the telco, a low pass filter is provided for each of the circuits to separate the voice from the DSL so that the voice can be transmitted over long distance lines without interference from the higher frequency signals of the DSL channel. The telco may be provided with numerous racks of cards containing the low-pass filters to provide the splitting of the DSL signals from the voice signals, this portion of the telco being referred to as the POTS splitter. An aspect in the construction of the circuitry at the POTS splitter is the use of a capacitive connection of the DSL line to the voice line to enable the aforementioned twisted pair to carry both the voice and the DSL or video signals from the telco to the subscriber premises, while the capacitive coupling prevents DC on the twisted pair from being communicated to the DSL circuitry.

There are times when it may be necessary to test the integrity of the line carrying the DSL signal through the telco to the subscriber premises. To conduct such a test, it is necessary to provide a DC connection through the POTS splitter. In addition, the test is conducted by injection of a test signal into the DSL line, and measuring reflections of the signal. With presently available equipment, there is an inconvenience in the conduction of such a test because it is necessary to enter the POTS splitter portion of the telco to provide a DC bypass around the capacitors which connect the DSL line to the voice line. This inconvenience represents a problem because of the need for additional personnel and additional time in the conduct of the test procedure.

SUMMARY OF THE INVENTION

The aforementioned problem is overcome and other advantages are provided, in accordance with the invention, by a construction of a bypass circuit which bypasses the capacitive connection of a DSL line to a voice line via a DC connection, and wherein the invention provides also for a remote activation of the bypass circuit, so as to enable conduction of the test procedure without requiring personnel to enter into the POTS splitter to handle the numerous racks of circuit cards for effecting the DC bypass during the test procedure. A separate bypass circuit is provided for connection of a DSL line to a voice line.

The bypass is accomplished by means of an electronically activated switch, or relay, which provides a DC path through the POTS splitter from the DSL port to the port which exits to the subscriber premises, the DC path bypassing the terminals of the capacitors which serve to connect the DSL line to the subscriber twisted pair line. Between the DSL signal source and the POTS splitter, there is provided a port for administration of the test signal, and also a port for administration of a bypass-switch activation signal. The invention includes a circuit which detects the switch activation signal, and in response to the switch activation, drives the switch from the normal switch position to the bypass position. The circuit includes a bandpass filter having a passband that selects the activation signal from among other signals which may be present, such as a voice signal or a video signal. The foregoing ports to the DSL line and the switch driver circuit allow personnel to operate from a location outside the POTS splitter to operate the bypass and to conduct a test of the DSL channel.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION OF THE INVENTION

Figure 1:
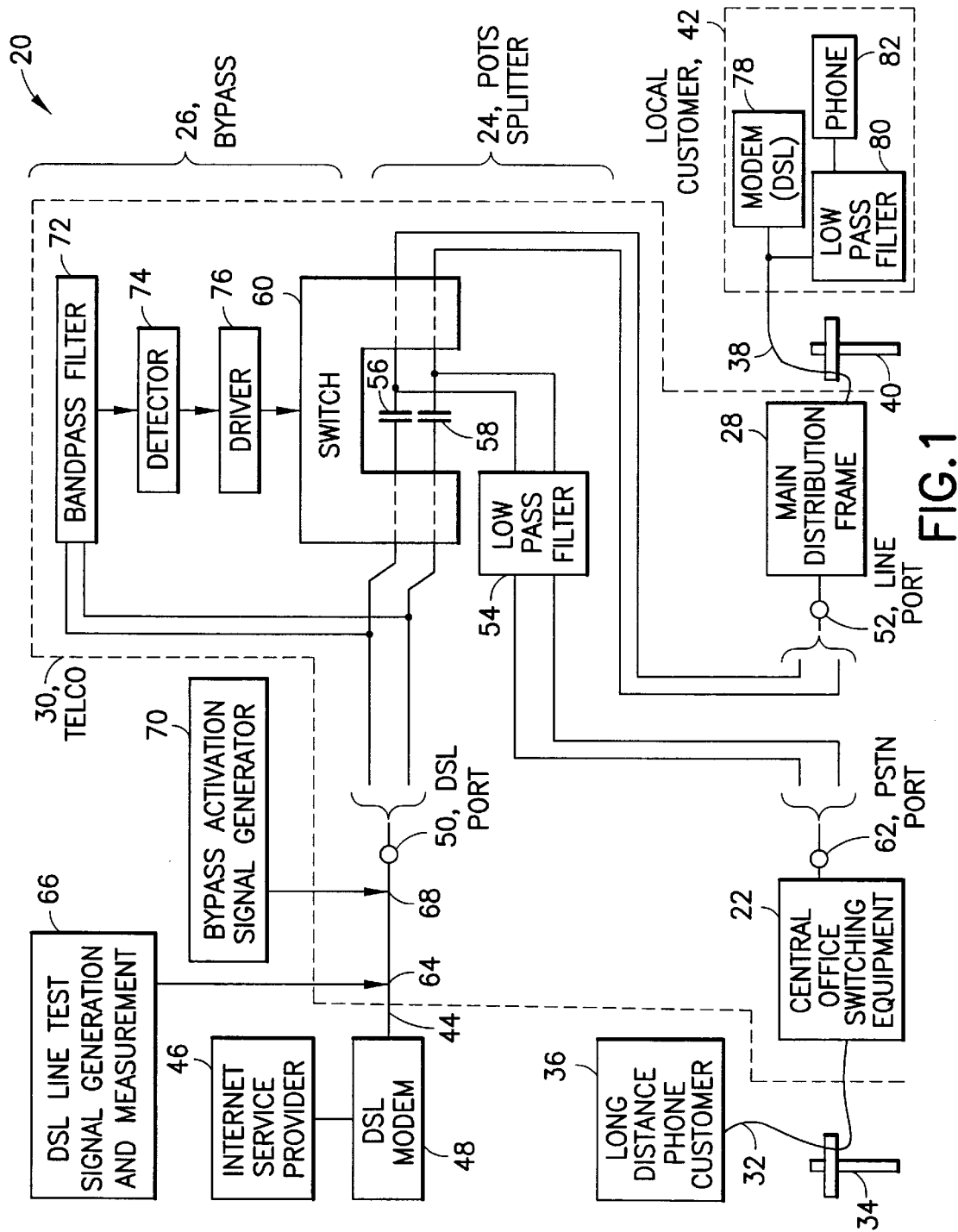
FIG. 1 shows diagrammatically electric circuitry of a telephonic communication system, including a remotely activated DC bypass in a POTS splitter in the telco, in accordance with the invention.

FIG. 1 shows diagrammatically interconnections among components of a telephone communication system 20, including central office switching equipment 22, a POTS splitter 24, a bypass 26 for the POTS splitter, and a main distribution frame 28 which are part of a telco 30. For convenience in the description of the invention, a single subscriber circuit is shown in the figure, it being understood that many circuits are handled by the telco with the aid of the switching equipment 22, and that connection to each of many local telephone customers is provided via the main distribution frame 28 of the telco 30. Also shown is a long distance phone line 32 carried by a telephone pole 34 for connecting between a long distance phone customer 36 and the switching equipment 22. A further phone line 38 carried by a telephone pole 40 connects the premises of a local customer 42 to the main distribution frame 28. A DSL line 44 connects an Internet Service Provider 46 via a DSL modem 48 to a DSL port 50 of the telco 30. The DSL port 50 connects via the POTS splitter 24 and the bypass 26 to a line port 52 which, in turn, connects with the distribution frame 28.

The POTS splitter 24 comprises a low-pass filter 54, and a pair of capacitors 56 and 58 that connect with a switch 60 of the bypass 26. The low-pass filter 54 connects from circuitry of the switch 60 and the capacitors 56, 58 via a PSTN port 62 to the switching equipment 22. The capacitors 56, 58 protect the DSL line 44 from DC voltage at the line port 52 and the PSTN port 62. A typical value of capacitance for each of the capacitors 56 and 58 is 0.12 uF (microfarads). The DSL line 44 has a port 64 whereby access is had for application of a test signal and for measurement of reflected signals on the DSL line by test equipment 66. The DSL line has a further port 68 for application of a signal by a generator 70 to activate the bypass switch 60. To facilitate the description of the invention, the signal generator 70 is shown separately from the test equipment 66, it being understood that, in practice, the signal generator 70 may be incorporated within the test equipment 66. Also, if desired, the test equipment 66 can be incorporated within equipment providing the DSL modem 48, thereby to reduce the number of separate components of the communication system 20. Such combination of equipment is simply a matter of convenience in the building of the communication system 20, and does not affect the practice of the invention.

The bypass 26 further comprises a bandpass filter 72, a detector 74, and a driver 76 for activation of the switch 60. For convenience in describing the circuitry of the POTS splitter 24 and its bypass 26, each of the signal-carrying lines 32, 38 and 44 are shown as having two conductors as they pass their respective ports 62, 52 and 50 to connect with the POTS splitter 24. The premises of the customer 42 has circuitry such as a modem 78 for receiving (and transmitting) video/data signals present in the DSL frequency band, a low-pass filter 80 which separates the high frequency signals from the voice signals, and a telephone 82 for reception (and transmission) of voice signals via the filter 80.

In the operation of the system 20, voice signals carried by the lines 32 and 38 pass through the low-pass filter 54. However, the relatively high frequency band of the signals on the DSL line 44 places these signals outside the passband of the filter 54, so that these signals are excluded by the filter 54 from the long distance phone line 32. The signals in the DSL frequency band are coupled from the DSL line 44 to the local subscriber line 38 by the capacitors 56 and 58, during normal operation of the system 20, but are coupled to the subscriber line 38 by a DC connection of the switch 60 during a test mode of the system 20. The testing is accomplished by the test equipment 66 which applies a test signal to sound out the lines 44 and 38 which serve as a channel for carrying the DSL signal from the modem 48 to the premises of the customer 42. Prior to initiating the testing, the generator 70 applies to the DSL line 44 a switch-activation command signal which is received via the bandpass filter 72 and detected by the detector 74. The switch-activation signal is a pulse having a duration of approximately 20 ms (milliseconds) or longer, by way of example, as may be required for activating the circuitry of the driver 76. Upon detection of the switch-activation command signal, the detector 74 signals the driver 76 to operate the switch 60 to provide the DC connection which bypasses the capacitors 56 and 58. Thereupon, the testing can be commenced.

More specifically, the driver 76 includes timing circuitry, as will be described in further detail with reference to FIG. 2, which, in response to the presence of the switch-activation signal, initiates a bypass interval having a length of 3.5 minutes during which interval the capacitors 56 and 58 are bypassed. It is to be understood that the duration of 3.5 minutes for the bypass interval is presented by way of example, and that some other length of the bypass interval, such as five or ten minutes may be employed by operation of the timing circuitry to provide such interval. At the end of the bypass interval, the bypass terminates and the capacitors 56 and 58 are again performing their function of coupling the DSL signal while isolating the DSL line 44 from direct current of the subscriber phone line 38. The bypass interval can be terminated earlier by reapplication of the switch-activation command signal before expiration of the 3.5 minutes.

In the choice of a suitable format for the switch-activation signal, in the preferred embodiment of the invention, a single pulse modulated onto a carrier of 18.4 kHz is employed because this value of frequency is midway between the upper edge of the voice spectrum (4.0 kHz) and the lower edge of the DSL spectral band (30 kHz). A bandwidth which is readily implemented for the bandpass filter 72 is 3.5 kHz, by way of example, which is more than adequate to pass the pulse of the switch-activation signal, and narrow enough to avoid any significant interference with the signal bands. By way of alternative embodiments of the invention, it is noted that a bandpass or high-pass filter with passband well above the upper edge of the DSL band (1104 kHz) could also be used to transmit the switch-activation signal, in which case, the pulse would be modulated on a higher frequency carrier such as 4 MHz, by way of example.

Figure 2:
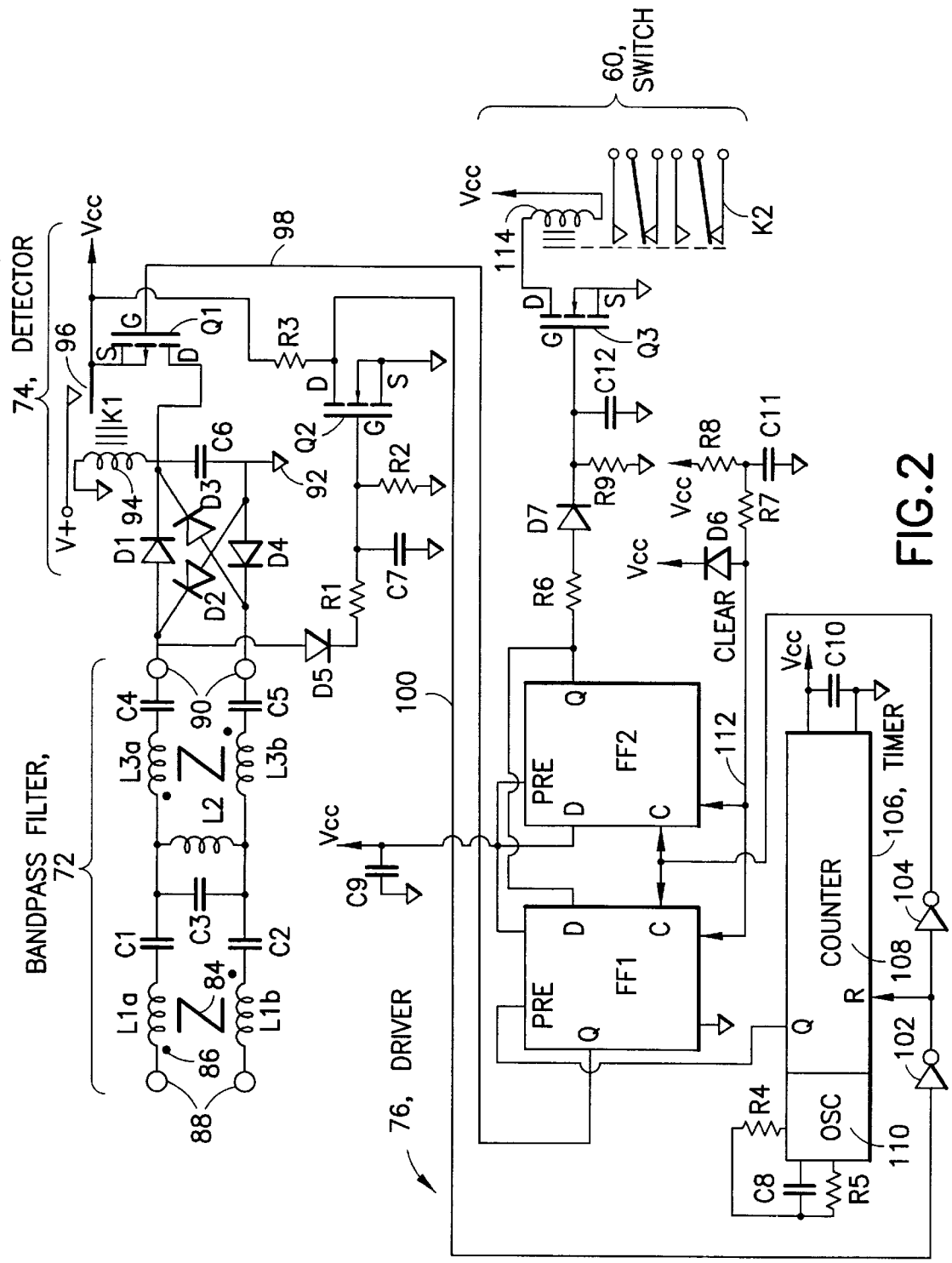
FIG. 2 is an electrical schematic diagram of circuitry of a bandpass filter, a detector of a bypass activation signal, and a driver of a bypass switch for the POTS splitter of FIG. 1.

With reference to FIG. 2, the bandpass filter 72 comprises two inductors L1a and L1b which are wound on a common core indicated at line 84, preferably in toroidal form, with the coupling polarity of the magnetic field indicated by dots 86. A capacitor C1 is connected serially with the inductor L1a to form a lateral branch of the ladder circuit of the filter 72, and a capacitor C2 is connected serially with the inductor L1b to form a further lateral branch of the ladder circuit. A capacitor C3 is connected in parallel with an inductor L2 to form a transverse branch of the ladder circuit connecting between the foregoing to lateral branches at the capacitors C1 and C2. A series connection of an inductor L3a with capacitor C4 form a third lateral branch connecting with the transverse branch, and a series connection of an inductor L3b with capacitor C5 forms a fourth lateral branch connecting with the transverse branch. The two inductors L3a and L3b are wound on a common core, preferably in toroidal form, with the coupling polarity of the magnetic field being indicated by dots.

An input terminal pair 88 of the filter 72 is located at terminals of the inductors L1a and L1b for connection with the DSL port 50 (FIG. 1). An output terminal pair 90 of the filter 72 is located at terminals of the capacitors C4 and C5. The following values of the components of the filter 72 are provided by way of example in the construction of a suitable filter, it being understood that other configurations of filters may also be employed. The inductances of the inductors L1a and L1b are the same and are equal to 1.4 mH (millihenries), the inductances of the inductors L3a and L3b are the same and are equal to 1.4 mH, the capacitances of the capacitors C1 and C2 are both equal to 0.027 uF, the capacitances of the capacitors C4 and C5 are both equal to 0.033 uF, the inductor L2 has an inductance of 160 uH (microhenries), and the capacitor C3 has a capacitance of 0.47 uF. The series and the parallel resonances of the various branches contribute to providing the desired center frequency and bandwidth with the aforementioned values.

The detector 74 connects with the output terminal pair 90 of the filter 72. The detector 74 comprises a full-wave bridge of four diodes D1, D2, D3 and D4, and a capacitor C6. The four diodes of the bridge are connected for rectifying the alternating current of the signal input to the filter 72, and then applying the resulting direct current to charge the capacitor C6 to a voltage approximately equal to the peak value of the signal input to the filter 72. One terminal of the capacitor C6 next to ground at 92, and the other terminal of the capacitor C6, which receives a positive charge relative to ground, connects with the coil 94 of a relay K1. The coil of the relay K1 is connected in parallel to the capacitor C6. The positive terminal of the capacitor C6 also connects to the drain terminal, D, of a transistor Q1, which is an FET (field effect transistor), preferably a MOSFET. A source terminal, S, of the transistor Q1 connects with a contact 96 of the relay K1, and a gate terminal, G, of the transistor Q1 connects via line 98 to a flip-flop FF1 of the driver 76. The source terminal of the transistor Q1 connects with a circuit node having a voltage potential identified as Vcc, which potential is applied to various other points within the circuitry of FIG. 2.

During a state of deactivation of the relay coil 94, the contact 96 is open. Upon energization of the coil 94 with current from the capacitor C6, the contact 96 closes to apply a power supply voltage V+ to the source terminal of the transistor Q1 and to the node having the voltage Vcc. Prior to a closure of the contact 96, as the capacitor C6 builds up charge, there is sufficient voltage to induce current flow within the transistor Q1 via a drain-to-source diode internal to the transistor Q1. This current through the transistor Q1 results in a relatively small positive value of voltage at Vcc. Subsequently, as the voltage across the capacitor C6 increases still further then, as noted above, the relay K1 is activated to close the context 96, at which time the value of the voltage Vcc increases further to V+.

The detector 74 comprises a second branch having a diode D5 which connects to the output terminal pair 90 of the filter 72 at the junction of diode D1 and capacitor C4. The second branch of the detector 74 further comprises a capacitor C7 of which one terminal is grounded and the second terminal connects via a resistor R1 with a cathode of the diode D5. A resistor R2 is connected in parallel to the capacitor C7. The second branch of the detector 74 further comprises a transistor Q2, which is an FET having a grounded source, and a gate terminal which connects to the junction of the capacitor C7 with the resistor R1. A drain terminal of the transistor Q2 connects via a resistor R3 to the circuit node of potential Vcc. The drain terminal of the transistor Q2 also connects via line 100 to an inverter 102 of the driver 76. The second branch of the detector 74 functions as a half wave detector wherein the diode D5 applies current to charge the capacitor C7. The series arrangement of the resistors R1 and R2 acts as a voltage divider which reduces the value of the voltage at the capacitor C7 as compared to the value of the voltage at the capacitor C6. The presence of the detected voltage at the capacitor C7 is operative to place the transistor Q2 in a state of conduction. Upon closure of the relay contact 96, the voltage Vcc is equal to the voltage V+, and current flows from drain to source in the transistor Q2. In the absence of the voltage across the capacitor C7, the transistor Q2 is in a state of nonconduction. The following component values are employed in the detector 74, namely, C6 and C7 are both 1.0 uF, and R1, R2, and R3 have values of 2 k, 20 k and 10 k ohms.

In the driver 76, the flip-flop FF1 and a further flip-flop FF2 are constructed as a dual, type-D flip-flop integrated circuit. The driver 76 further comprises a second inverter 104, and a timer 106, wherein the timer 106 comprises a counter 108 and an oscillator 110. A frequency of oscillation of the oscillator 110 is set by use of external resistors R4 and R5, and an external capacitor C8. Power to the dual flip-flops FF1 and FF2 is provided by the voltage Vcc, wherein the flip-flops FF1 and FF2 are connected between Vcc and ground. A capacitor C9 is connected in parallel to the flip-flops between Vcc and ground. Power to the timer 106 is also provided by the Vcc, wherein the timer 106 is connected between Vcc and ground with a capacitor C10 connected in parallel to the timer 106 between Vcc and ground.

The voltage level on line 112 is applied to both of the flip-flops to clear their output values at their respective terminals Q to a relatively low voltage of logic "0" during power-up of the circuitry connected to Vcc. The voltage level on line 112 is attained by connection of the line 112 via a diode D6 to Vcc, and via a series connection of resistors R7 and R8 to Vcc. A capacitor C11 connects between the junction of the resistors R7 and R8 to ground. During power up, as Vcc increases, the capacitor C11 holds the junction of the resistors R7 and R8 near ground potential, this low potential holding the output terminals Q of the respective flip-flops at logic 0. Subsequently, as the capacitor C11 slowly charges, and the voltage level at line 112 rises, voltage levels of the signal lines within the driver 76 and the detector 74 have stabilized, and the flip-flops FF1 and FF2 can be operated normally. The diode D6 is back biased against the potential Vcc to provide a safety function of draining the charge of the capacitor C11 upon de-energization of the circuitry so as to protect the flip-flop from the high-voltage of the capacitor.

The driver 76 further comprises a transistor Q3, which is an FET, preferably a MOSFET, for operating the switch 60 (FIG. 1) which is implemented in the circuitry of FIG. 2 by means of a relay K2. A gate terminal of the transistor Q3 is connected to the output terminal Q of the flip-flop FF2 via the serial connection of a resistor R6 and a diode D7, and wherein a parallel combination of a resistor R9 and a capacitor C12 connects between the gate terminal and ground. The relatively high-voltage of the logic-1 state at the output terminal Q of the flip-flop FF2 feeds current through the resistor R6 and the diode D7 to the gate of the transistor Q3 to place the transistor Q3 in May state of conduction. The current in the transistor Q3 flows through a coil 114 of the relay K2 to operate the contacts of the relay K2 to provide various closures and openings of the contacts for bypassing the capacitors 56 and 58 of the splitter 24 (FIG. 1). The following component values are employed, namely, R4 and R5 are both 120 k ohms, and C8 is 0.2 uF. The resistors R6, R7, R8 and R9 are 50 k, 1 k, 50 k and 250 k ohms, respectively. The capacitors C9, C10, C11 and C12 are 1.0 uF, 4,7 uF, 1.0 uF and 4.7 uF.

In operation the circuitry of the driver 76 provides logic functions in conjunction with the operation of the detector 74. The counter 108 is reset (R) by a signal outputted by the first inverter 102. The counter outputs a signal at terminal Q which is applied to a preset terminal of the flip-flop FF1. The preset terminal and the D terminal of the flip-flop FF2 are connected to Vcc. The output terminal Q of the flip-flop FF2 is connected also to the D terminal of the flip-flop FF1. The output terminal Q of the flip-flop FF1 drives, via the line 98, the gate of the transistor Q1 to place the transistor Q1 in a state of conduction. The signal outputted by the second inverter 104 is applied to the clock inputs of both of the flip-flops FF1 and FF2.

In the dual flip-flops FF1 and FF2, both the preset and the clear functions are enabled by a logic 0 which override the normal function of transferring the logic level at the D input to the Q output at 0-to-1 transitions of the clock input C. Upon turn-on of power, the status of the output is desire to be a 0 at Q for both of the flip-flops. This is accomplished by connection of the clear line 112 to the capacitor C11 with the pull-up resistor to the Vcc supply. This forces the outputs Q to a low level while the supply and the clock inputs are still in transition. The low voltage level at the capacitor C11 is retained until after conclusion of the transitions in the supply and the clock inputs. Upon attainment of the logic-1 voltage level, normal flip-flop operation is enabled.

In the timer 106, the reset signal provided by the first inverter 102 is a logic 1, which sets the counter 108 to zero and stops the oscillator 110. Upon termination of the reset, the counter 108 begins counting up to a preset value of maximum count. The Q output of the counter 108 makes a transition from a logic 1 (high voltage) to a logic 0 (low voltage) after a predetermined interval of time, such as 3.5 minutes, has elapsed. The inverters 102 and 104 each contain a Schmidt trigger input for improved reliability.

During normal operation of the telephone communication system 20, the circuitry of FIG. 2 is de-energized. Upon detection of the switch-activation signal by the detector 74, wherein the value of the voltage Vcc begins to rise through action of the drain-to-source internal diode of the transistor Q1, the various capacitors and resistors being energized by the voltage Vcc begin functioning as timing elements to prevent random logic status of the active components upon the turn-on of power. After a period of time, a standby status is reached.

The following sequence occurs during the period of time between the initial Vcc rise and the standby status. The transistor Q2 turns on when the voltage across capacitor C7 exceeds the gate-to-source threshold of the transistor Q2. This places the timer 106 in its reset mode, prevents a preset of the flip-flop FF1, and holds the clock signal output from the inverter 104 at logic 0. Also, the clear inputs to the flip-flops FF1 and FF2 transition from logic 0 to logic 1 after the capacitor C11 has charged to its full voltage, leaving the Q outputs of the flip-flops FF1 and FF2 at logic 0; transistor Q1 turns on. Transistor Q3, which was initially de-energized before energization of the relay K1, remains in a state of nonconduction because the Q output of flip-flop FF2 is at logic 0 and the charging rate of capacitor C12 is sufficiently slow to prevent possible turn-on transients at the Q output of the flip-flop FF2 to have activated the transistor Q3.

The above-noted duration of the switch-activation signal inputted to the bandpass filter 72 is sufficiently long to allow standby status to be achieved. The standby status remains in effect until the switch-activation signal terminates. Upon termination of the switch-activation signal, the capacitors C6 and C7 of the detector 74 discharge, but the relay K1 is kept energized by operation of the transistor Q1 which remains in a state of conduction for providing current to the coil of the relay K1. As a result of the discharging of the capacitor C7, there is a turning-off of the transistor Q2. This results in a termination of the resetting mode of the timer 106, and allows the counter 108 to begin counting timing pulses produced by the oscillator 110. Also, there occurs a 0-to-1 transition at the clock (C) inputs to the flip-flops, resulting in a logic 1 state at the Q output of the flip-flop FF2 where a logic 0 remaining at the Q output of the flip-flop FF1. The transistor Q1 remains in its state of conduction, and the capacitor C12 begins charging. When the voltage across the capacitor C12 reaches the gate-to-source threshold of the transistor Q3, the transistor Q3 conducts current and energizes the coil of the relay K2. Thereupon, the contacts of the relay K2 provide the bypass of the splitter capacitors 56 and 58.

The bypass of the splitter capacitors 56 and 58 is retained by the energized relay K2 until either the timer 106 has counted out the aforementioned interval of 3.5 minutes, or until the relay K2 is de-energized sooner by a further application of the switch-activation signal to the bandpass filter 72. With respect to termination of the bypass by a completion of the timing interval, the output Q of the timer 106 transitions from a logic 1 to a logic 0 producing a preset of the flip-flop FF1. This change is the logic level of the Q output of the flip-flop FF1 from a 0 to a 1 with a resulting turning-off of the transistor Q1. Thereupon, the coil current of the relay K1 terminates, and the charge on both of the capacitors C9 and C10 decays until all components are turned off, including the relay K2. Deactivation of the relay K2 terminates the bypassing of the splitter capacitors 56 and 58.

In the event that the bypassing of the splitter capacitors 56 and 58 is terminated early by application of the further switch-activation signal, the capacitor C7 of the detector 74 is recharged to activate the transistor Q2. The signal outputted by the transistor Q2 on line 100 terminates counting by the counter 108 by resetting the counter 108. The circuit remains in this state until termination of the switch-activation signal in the bandpass filter 72. Thereupon, the transistor Q2 turns off resulting in a low-to-high transition of the clock inputs to the flip-flops FF1 and FF2. This changes a logic level at the Q output of the flip-flop FF1 from a 0 to a 1. The transistor Q1 turns off with a termination of the coil current of relay K1. It is noted that the capacitor C6 discharges upon termination of the switch-activation signal, and that the capacitors C9 and C10 discharge upon deactivation of the relay K1. Thereupon, all of the components are deactivated, including the relay K2 with resulting termination of the bypassing of the splitter capacitors 56 and 58.

Figure 3:
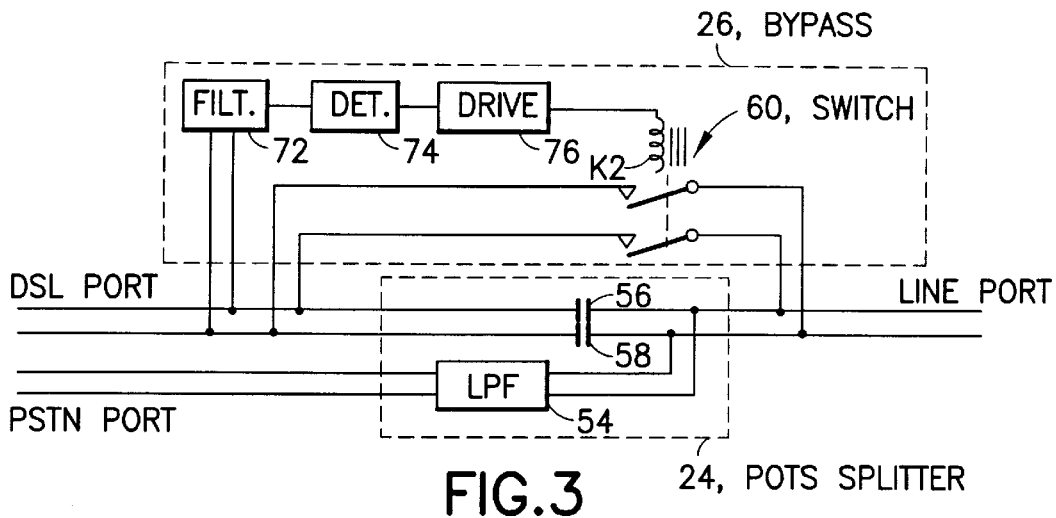
FIGS. 3, 4, and 5 show different embodiments of a bypass switching circuit employing the switch of FIG. 2.
Figure 4:
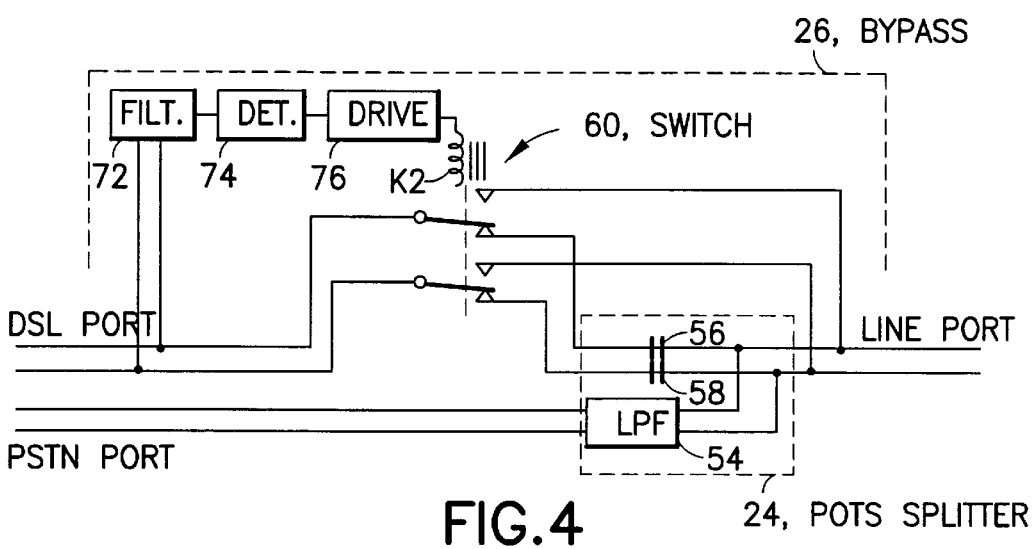
Figure 5:
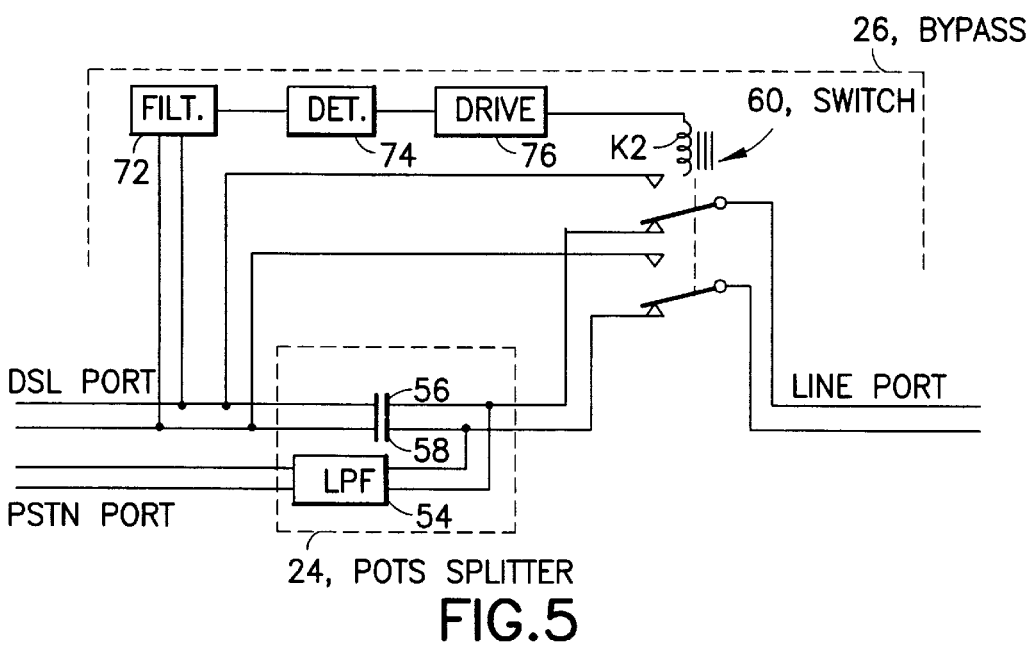

With reference to FIGS. 1, 3, 4 and 5, and is noted that the switch 60 of the bypass 26 provides for a connection of circuitry between the three ports, namely the DSL port 50, the line port 52 and the PSTN port 62 to accomplish the bypass function. FIG. 3 shows a first configuration of the circuitry of the switch 60. Closure of the contacts of the relay K2 provide a DC path between the DSL port and the line port. The DC path bypasses the capacitors 56 and 58. In the circuitry of FIG. 4, the contacts of the relay K2 provide for an alternative connection of the DSL port to either the capacitors 56 and 58 or to the line port. The alternative connection accomplishes the bypass function. In the circuitry of FIG. 5, the contacts of the relay K2 provide for an alternative connection of the line port to either the capacitors 56 and 58 or to the DSL port. The alternative connection accomplishes the bypass function.

Figure 6:
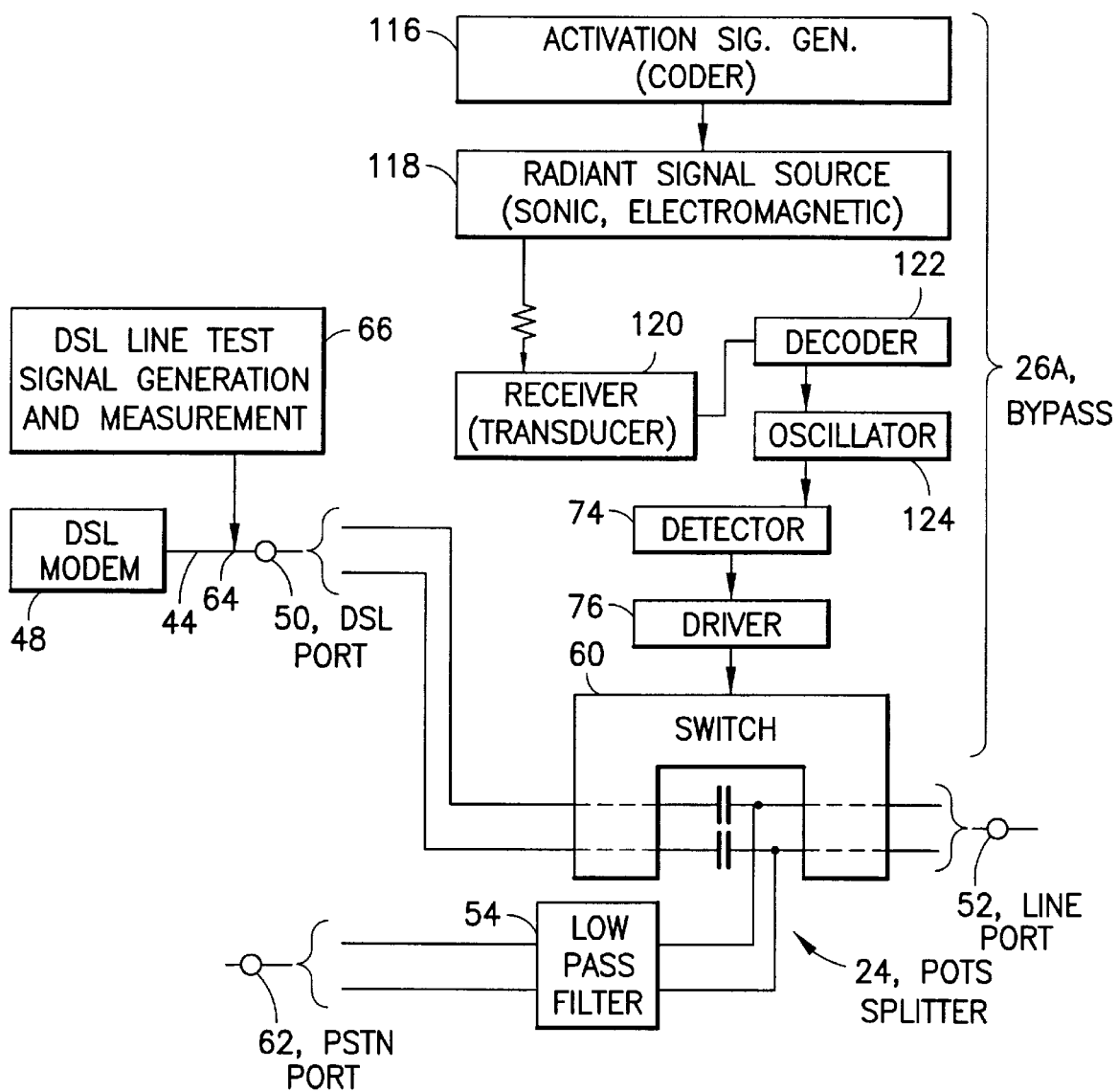
FIG. 6 presents a fragmentary diagrammatic view of a communication system wherein a bypass is implemented by command from a radiated signal in accordance with an alternative embodiment of the invention.

FIG. 6 shows a fragmentary view of FIG. 1 which is altered to show an alternative embodiment of communication system 20A which differs from the communication system 20 of FIG. 1 in that, instead of making a direct connection to the DSL line 44 for transmitting and receiving the bypass switch-activation command signal, the system 20A of FIG. 6 employs a signal generator 116 which drives a radiant signal source 118. The signal generator includes a coding circuit to output a coded signal for driving the radiant signal source 118. By way of example, the radiant signal source 118 may be an acoustic source radiating a sound at a high frequency (ultrasonic) outside the range of audible sounds, or alternatively, an electromagnetic signal such as an infrared or microwave signal. The coded signal from the generator 116 amplitude modulates the signal radiated by the source 118 so that a coded radiant signal is transmitted by the source 118. The generator 116 and the radiant source 118 may be combined in a single modular unit, similar to the remote controller commonly used in homes for operation of a VCR (video cassette recorder).

In the system 20A, each DSL line has its own set of splitter capacitors 56 and 58, and its own splitter bypass 26A. Each DSL line with its corresponding phone line 38 to the premises of a customer 42 (FIG. 1), to which phone line the DSL line is coupled by capacitors 56 and 58, may be regarded as a communication channel. Each bypass 26A comprises a receiver 120 of the radiant signal transmitted by the radiant source 118. In the case wherein the radiant signal is an acoustic signal, the receiver may comprise a microphone and an amplifier, wherein the microphone functions as a transducer for converting the received sonic signal to an electrical signal and the amplifier amplifies the electrical signal to a suitable level for signal processing. By way of further example, if the radiant signal is an infrared signal, the receiver 120 may comprise a photodetector which converts incident infrared radiation to an electric signal. In the case of a microwave signal radiated by the source 118, the receiver 120 may comprise a diode detector of microwave energy for providing an electrical signal. The electrical signal outputted by the receiver 120 is amplitude modulated with the code provided by the generator 116. In accordance with a feature of this embodiment of the invention, each DSL line and its communication channel is provided with an identifying code, and the corresponding bypass 26A is provided with a decoder 122 connected to the receiver 120. The decoder 122 for each bypass 26A is programmed to acknowledge receipt of a code identifying the corresponding DSL line and its communication channel to be tested.

In order to initiate testing of a specific one of the DSL lines at the telco 30 (FIG. 1), the personnel conducting the test identify the line at the generator 116 so as to output the corresponding code. The decoders 122 associated with the various DSL lines are nonresponsive to the received code except for the decoder 122 of the identified DSL line, which decoder 122 acknowledges the command for operation of the bypass 26A by outputting an acknowledgement signal, such as a logic-1 signal. The logic-1 signal activates an oscillator 124 to produce an oscillatory signal similar to that outputted by the bandpass filter 72 (FIG. 1) to be received by the detector 74, in the manner described above in the description of the system 20 (FIG. 1). The logic-1 signal is a pulse signal having the same duration as the switch-activation command signal described above for the system 20. Therefore, the signal received by the detector 74 in the system 20A is indistinguishable from the signal received by the detector 74 in the system 20, and the detector 74, the driver 76 and the switch 60 function to provide the bypass of the capacitors 56 and 58 in the system 20A in the same manner as was described above for the operation of these components in the system 20.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. In a telephone communication system having a telco interconnecting a local phone customer to a long distance phone customer and to an internet service provider, the communication system employing a first spectral band and a second spectral band for communication of signals, wherein the first spectral band is lower in frequency than the second spectral band, the upper edge of the first band being lower in frequency than the lower edge of the second band, and wherein the system includes multiple communication channels of which each channel has a first line for carrying signals at both the first and the second spectral bands and a second line for carrying signals at only the second spectral band, and wherein capacitors are employed at the telco in each of said channels for connection of the second line to the first line for exclusion of DC at a signal splitter of the communication system, the signal splitter being located at the telco, the improvement wherein the system further comprises, for each of said channels, a bypass DC signal path for an alternative connection of the second line to the first line in substitution for the connection of the capacitors;

an activation circuit for activating the bypass signal path to bypass the capacitors;

wherein the activation circuit includes timing means for establishing an interval of time in which the bypass is active, the interval of time being sufficiently long to accomplish a testing of the first and the second lines with DC connection between the first and the second lines; and the activation circuit includes a receiver of a command signal, the receiver serving to trigger operation of the activation circuit to initiate the time interval in response to receipt of the command signal.

2. A system according to claim 1 wherein the command signal is transmitted along said second line, and said receiver includes a filter tuned to receive the command signal to the exclusion of signals in the first and the second spectral bands.

3. A system according to claim 1 wherein the command signal is a first command signal, and said activation circuit further comprises logic means which terminates the time interval upon receipt of a further command signal prior to expiration of the time interval.

4. A system according to claim 3 wherein the further command signal is identical to the first command signal.

5. A system going to claim 1 wherein said bypass path is located between said first line and said second line, and said activation circuit includes a switch operative to connect said first line to said second line to provide said bypass path.

6. A system going to claim 1 wherein said bypass path is located between said first line and said second line, and said activation circuit includes a switch operative to connect alternatively said second line to said capacitors in the absence of said bypass path and to said first line to accomplish said bypass path.

7. A system going to claim 1 wherein said bypass path is located between said first line and said second line, and said activation circuit includes a switch operative to connect alternatively said first line to said capacitors in the absence of said bypass path and to said second line to accomplish said bypass path.

8. A system according to claim 1 wherein the command signal is transmitted as a radiant signal, and said receiver includes a transducer for converting the radiant signal to an electrical signal.

9. A system according to claim 8 wherein the radiant signal is coded to identify a specific one of said communication channels, each of said multiple channels includes an activation circuit having a receiver identical to the receiver of the activation circuit for a first one of said channels, all of said activation circuits include decoders for monitoring a radiant signal as received by the receivers of corresponding ones of said activation circuits, and a bypass signal path is established for one of said channels corresponding to an identification of channel made by one of said decoders.

* * * * *